D. Phillips,
Water Wheel.
N° 43,039.  Patented June 7, 1864.
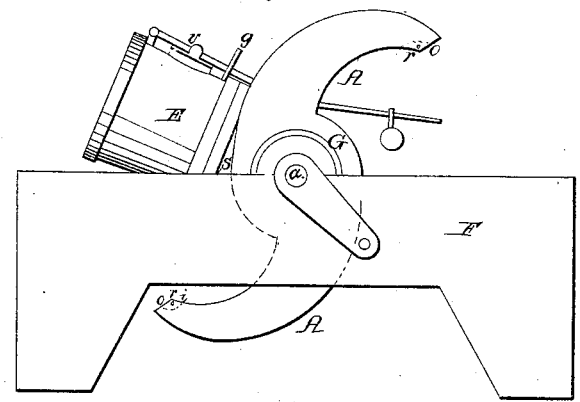
Fig. 1.
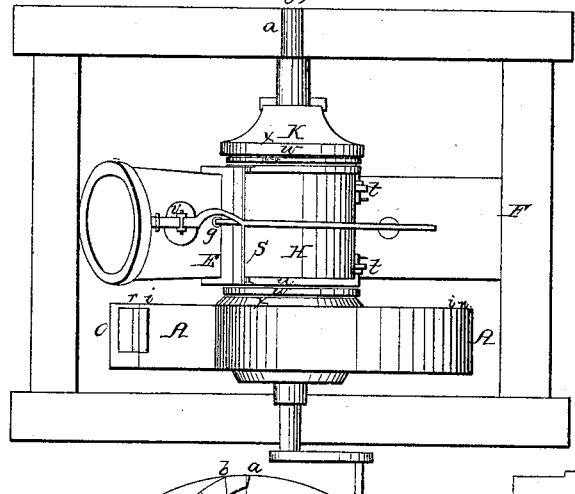
Fig. 2.
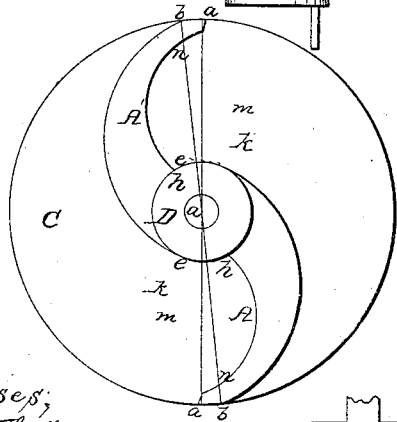
Fig. 4.
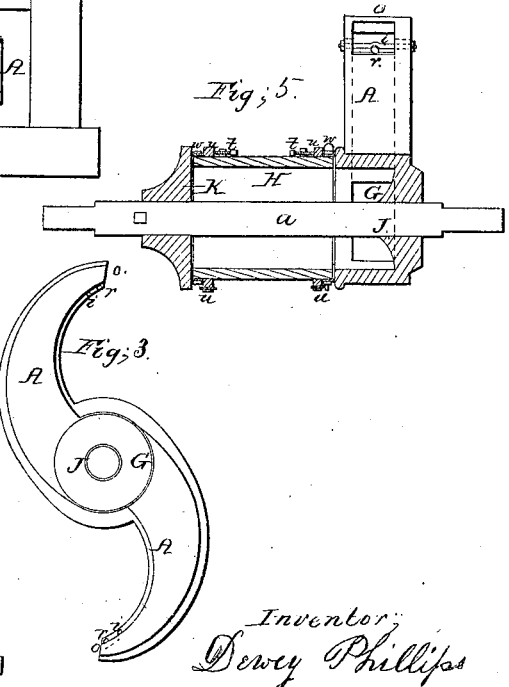
Fig. 5.
Fig. 3.
Witnesses:
Lemuel W. Serrell
Chas. H. Smith
Inventor:
Dewey Phillips

UNITED STATES PATENT OFFICE.

DEWEY PHILLIPS, OF SHAFTSBURY, VERMONT.

IMPROVED WATER-WHEEL.

Specification forming part of Letters Patent No. 43,039, dated June 7, 1864.

*To all whom it may concern:*

Be it known that I, DEWEY PHILLIPS, of Shaftsbury, in the county of Bennington and State of Vermont, have invented a new and useful Improvement in the Construction of Water-Wheels; and I hereby declare that the following is a full and exact description thereof, reference being had to the accompanying drawings, and to the letters and figures marked thereon, which make a part of this specification.

The nature of my said invention consists in a safety-valve at the lower end of the supply-pipe, in combination with the gate that shuts off the water from the wheel, whereby the concussion that would arise if the gate were suddenly closed is relieved. I also provide a peculiar packing between the water-cylinder and the revolving S shaped wheel that can be adjusted as occasion may require for keeping the parts water-tight.

To enable others skilled in the art to make and use my said invention, I will proceed to give a more particular description of its construction and operation.

In the accompanying drawings, to which reference is made, like letters and figures indicate like parts.

Figure I is an elevation of the wheel, frame, &c.; Fig. II, a plan of the frame, wheel, cylinder, and conductor; Fig. III, a sectional view of the interior and walls of the wheel; Fig. IV, a diagram of the center chamber and the course of the water through the arms, by which to show the manner of fixing the points from which the greater and lesser curves of the arms of the wheel are described.

Supposing the diameter of the wheel, or distance from point to point of the arms, to be four feet. (See Fig. IV.) Let $a$ be the center of the shaft, through which the base-line $b\ b$ passes, from which point the circle C, or periphery, and also the circle D, which is one-fourth the diameter of the circle C, are described—one-half inch from the base line $b\ b$ on the circle C. I place the points $d\ d$ at the extremes of the arms, and three inches from the points $d\ d$ on the same circle, but on opposite sides of the line $b\ b$, are placed the points $b\ b$. Then on the circle D, two inches from the line $b\ b$, are set the points $e\ e$, and on the opposite sides of the line $b\ b$. On the same circle, at the distance of three and one-quarter inches, are placed the points $h\ h$. Then strike a line from $b$ to $b$, and place $n\ n$ on the lines two and one-half inches from $b\ b$. Then set the compasses fifteen and seven-eighths inches, and from the points $b\ b$ and $e\ e$ they intersect at $k\ k$, which are the centers of the greater or outer circles of the arms, and from the points $n\ n$ and $h\ h$, the compasses being set at ten and one-fourth inches, they intersect at $m\ m$, from which the inner or smaller circles of the arms are described. At the points $n\ n$ are the centers on which the small gates $i\ i$ are hung, to regulate the quantity of water to be discharged from the outlets.

F is a strong frame on which the wheel and cylinder rest.

$a$ is the shaft of iron or other suitable material.

E is the conductor by which the water is conveyed from the tube to the sluice, to which it is firmly attached by bolts or otherwise, being placed at any suitable angle to receive the water from the tube, and having apertures for the safety-valve $v$ and gate-rod on the side.

$g$ is the gate, made to slide within the conductor, against the face of the sluice, the rod of which is packed to prevent leakage.

S is the sluice, an appendage of the cylinder, into one side of which it conducts the water from the gate $g$.

H is the cylinder through which the water passes from the gate $g$ to the center chamber of the wheel, encircling the shaft $a$, one end of which cylinder is closed by a head or disk keyed to and revolving with the shaft, and secured from leakage by a packing, hereinafter described. The other end of the cylinder H sets contiguous to, but not touching, the side of the center chamber of the wheel. The ends of this cylinder H do not touch either the disk K or wheel A, (see section, Fig. 5,) but are kept water-tight at these points by packing, hereinafter described.

To obtain a greater power without increasing the diameter of the cylinder, (which is desirable on account of leakage and power,) the length of the cylinder and gate may be sufficiently increased, and another wheel of the same dimensions fitted to revolve in the same direction substituted in the place of the disk K; or, on the same principle, the diameter of the cylinder may be reduced and retain the power of one wheel.

G is the center chamber, that section of the wheel through which the water passes from the cylinder to the arms, the back side of which chamber is raised in the center around the shaft, and recedes in a curve toward the periphery, to convey the water in an unbroken current into the arms.

J is (see sketch) a curve raised around the shaft in the back of the center chamber, G.

A A are the arms or water courses, (for the form and description of which see diagram, Fig. IV, and manner of striking their curves.)

$o$ $o$ are the outlets for discharging the water from the arms.

$i$ $i$ are the small gates hung on the lesser or inside circle of the arms at the points $n$ $n$, Fig. IV, to regulate the quantity of water to be discharged from the outlets, being kept in their proper position by keys between the gates and the bolts $r$ $r$.

$r$ $r$ are the bolts near the outlets $o$ $o$, to hold the sides of the arms firmly against the gates $i$ $i$, and sustain them in their proper position by means of keys, or otherwise.

$v$ is the safety-valve, to cover the aperture in the conductor E, near the gate $g$, to dispose of any extra pressure, from shutting the gate or otherwise, and is held in its place by a simple or compound lever and weights.

$t$ $t$ are two lips projecting from the outside of the cylinder H, near the ends, on a horizontal line with the center, through a hole in which a bolt is brought to bear by a nut against the bands $u$ $u$, which force the packing against the face of the wheel and disk K.

$w$ $w$ are two thin iron bands, placed on the outside of leather belts, (filled with tallow or other oily substance,) or their equivalents, used as a packing to prevent leakage in the joints between the ends of the cylinder, wheel, and disk, the bands being drawn around the belts or packing by screws and nuts, connecting the two ends of the bands to secure a water-joint between the packing and cylinder.

$u$ $u$ are the inner bands on the cylinder, pressed by screws to tighten the packing against the wheel and disk.

$x$ $x$ are two screw-bolts, turning in nuts raised from the outer edge of the inner bands, $u$ $u$, on the opposite side of the lips $t$ $t$, and pressing against the ends of the sluice, by which the bands are pressed against the packing to keep it in its proper place.

The foregoing description relates principally to a wheel constructed of metal; but when made of wood it is constructed of three thicknesses of plank, the back-side thickness being a perfect circle or disk, and having a circle of plank raised on the outside, which, together with the raised circle J in the chamber G, form a strong nut to connect the wheel to the shaft, the inside thickness or face being also a perfect circle of the same diameter, with a circular aperture in the center, being the diameter of the chamber G, and having a raised circle on the face, against which the packing is pressed, as before described. The center thickness is of the same diameter as the others, except the depressions before the outlets to discharge the water freely, the thickness of the plank forming the depth of the arms, and filling the whole space between the sides of the wheel (except the chamber G) and the arms or water-courses, the several thicknesses of the plank being firmly pinned or bolted together. One or more arms may be added to the above by decreasing their width from the inner circle, leaving the outer or greater circle unmoved or by increasing the diameter of the chamber and cylinder, where economy of water is not required.

The wheel may be used on a horizontal or perpendicular shaft, as the case may require.

Operation: The wheel being constructed as herein specified, and the water being admitted in at the side of the cylinder, revolves around the shaft in the same direction with the wheel, and passes in a spiral current into the center chamber, G, and is directed by the curve J into the arms, and proceeding from the points $e$ $e$ (see diagram) it leaves the periphery of the chamber G at an almost imperceptible but gradually-increasing angle, acting against the outer or greater circle of the arms with a force proportioned to the head of water and velocity of the wheel.

The above-described wheel has been in practical and successful operation for the last eighteen months.

I do not claim Barker's nor Parker's construction of water-wheels; but

What I claim, and desire to secure by Letters Patent, is—

1. The conductor E, formed circular at one end and rectangular at the other end, in combination with the cylinder H, sluice S, and gate $g$, for the purposes and as specified.

2. The band of leather or other flexible material, surrounded by the ring $w$, and kept to its place by the ring $u$ and adjusting-screws, in combination with the cylinder H and wheel A or disk K, for the purposes specified.

3. The safety-valve $v$, in combination with the gate $g$, the said valve being near the gate, as and for the purposes specified.

4. The combination of the cylinder H, sluice S, chamber G, and water-passages A, in the manner and for the purposes specified.

DEWEY PHILLIPS.

Witnesses:
DENNIS J. GEORGE,
JOHN HASTINGS.